US012461524B2

(12) United States Patent
Liu et al.

(10) Patent No.: US 12,461,524 B2
(45) Date of Patent: Nov. 4, 2025

(54) CORRECTION OF SENSOR DATA ALIGNMENT AND ENVIRONMENT MAPPING

(71) Applicant: Zoox, Inc., Foster City, CA (US)

(72) Inventors: Chengzhi Winston Liu, San Mateo, CA (US); Derek Adams, Pasadena, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/111,463

(22) Filed: Feb. 17, 2023

(65) Prior Publication Data

US 2023/0221719 A1 Jul. 13, 2023

Related U.S. Application Data

(62) Division of application No. 16/697,117, filed on Nov. 26, 2019, now Pat. No. 11,604,465.

(51) Int. Cl.
*G05D 1/00* (2024.01)
*G01C 21/36* (2006.01)

(52) U.S. Cl.
CPC ....... *G05D 1/0088* (2013.01); *G01C 21/3676* (2013.01); *G05D 1/0221* (2013.01); *G05D 1/0276* (2013.01)

(58) Field of Classification Search
CPC .. G05D 1/0088; G05D 1/0221; G05D 1/0276; G05D 2201/0213; G01C 21/3676;

(Continued)

(56) References Cited

U.S. PATENT DOCUMENTS 9,612,123 B1 4/2017 Levinson et al.
9,916,703 B2 3/2018 Levinson et al.
(Continued)

FOREIGN PATENT DOCUMENTS

DE 102017210798 A1 12/2018
JP WO2016031229 A1 3/2016
WO WO-2017079460 A2 * 5/2017 ............... B60Q 1/26

OTHER PUBLICATIONS

Office Action for U.S. Appl. No. 16/697,117, mailed on Apr. 27, 2022, Liu, "Correction of Sensor Data Alignment and Environment Mapping", 14 Pages.

(Continued)

*Primary Examiner* — Scott A Browne
*Assistant Examiner* — Shahira Baajour

(57) ABSTRACT

Generating a map associated with an environment may include collecting sensor data received from one or more vehicles and generating a set of links to align the sensor data. A mesh representation of the environment may be generated from the aligned sensor data. A system may determine a proposed link to add, a proposed link deletion, and/or a proposed link alteration, and receive a modification comprising instructions to add, delete, or modify a link. Responsive to receiving a modification, the system may re-align a window of sensor data associated with the modification. The modification and/or sensor data associated therewith may be collected as training data for a machine learning model, which may be trained to generate link modification proposals and/or determine sensor data that may be associated with a poor sensor data alignment.

20 Claims, 5 Drawing Sheets

(58) Field of Classification Search
CPC ............ G01C 21/3602; G01C 21/3804; G01C 21/387; G01C 21/3815
See application file for complete search history.

(56) References Cited

U.S. PATENT DOCUMENTS

| | | | |
|---|---|---|---|
| 10,649,459 | B2 | 5/2020 | Wang et al. |
| 11,010,907 | B1* | 5/2021 | Bagwell .................. G06V 20/56 |
| 2014/0379256 | A1 | 12/2014 | Stipes et al. |
| 2017/0248963 | A1 | 8/2017 | Levinson et al. |
| 2017/0277187 | A1 | 9/2017 | Refai et al. |
| 2020/0088520 | A1* | 3/2020 | Lin ....................... G05D 1/0274 |
| 2020/0141740 | A1* | 5/2020 | Hamer ............... G01C 21/3811 |
| 2021/0157316 | A1 | 5/2021 | Liu et al. |

OTHER PUBLICATIONS

Office Action for U.S. Appl. No. 16/697,117, mailed Aug. 2, 2022, Liu, "Correction of Sensor Data Alignment and Environment Mapping", 7 pages.
The International Preliminary Report on Patentability for PCT Application No. PCT/US20/61808, mailed Jun. 9, 2022, 8 pages.
The PCT Search Report and Written Opinion mailed Mar. 5, 2021 for PCT Application No. PCT/US20/61808, 11 pages.
Extended European Search Report mailed Nov. 7, 2023 for European Application No. 20894737.4, a foreign counterpart to U.S. Pat. No. 11,604,465, 13 pages.
Office Action for Japanese Application No. 2022-529269, Dated Jul. 2, 2024, 7 pages.
Examination Report for European Application No. 20894737.4, Dated Feb. 19, 2025, 9 pages.

* cited by examiner

CORRECTION OF SENSOR DATA ALIGNMENT AND ENVIRONMENT MAPPING

RELATED APPLICATION

This application is a divisional of and claims priority to U.S. patent application Ser. No. 16/697,117, filed Nov. 26, 2019, which is incorporated herein by reference for all purposes.

BACKGROUND

Robots and other devices, such as augmented reality devices, may collect sensor data to determine what objects are in an environment surrounding the device and where the device is in the environment relative to those objects. In some examples, the sensor data may be collected to generate a map of the environment and a path of the device through the environment. Inaccuracies in such a map may cause a device relying on the map to incorrectly determine a location of the device in the environment, which may inhibit operations performed by the device or even risk the safety of a user of the device or others in the environment.

Moreover, sensor data and/or the map may be incredibly complex and/or encoded in a machine language and be collected over a large region, such as an entire city. Any of these factors make it implausible or even impossible for a human to detect an error in the sensor data and/or in the map generated therefrom.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 5A depicts a link deletion between two poses located in different tunnels. FIG. 5B depicts a link addition between two poses on either side of a highway.

DETAILED DESCRIPTION

Figure 1:
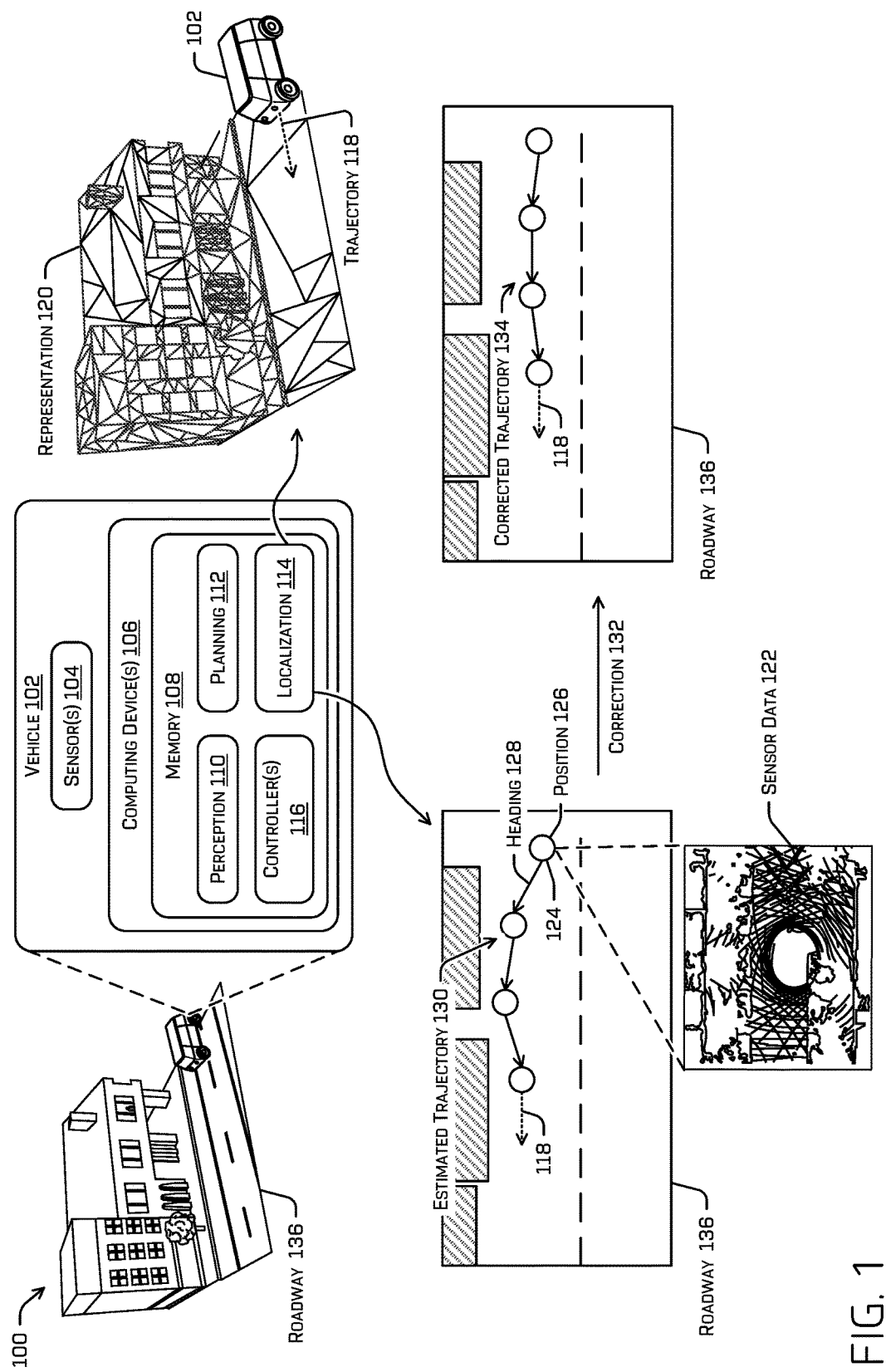
FIG. 1 illustrates an example scenario in which an autonomous vehicle configured with a localization component may determine a pose of the autonomous vehicle relative to the environment based at least in part on sensor data and a map and/or may collect sensor data for determining an estimated trajectory of the vehicle and/or a map.

Generating a map associated with an environment may include collecting sensor data received from one or more vehicles. A vehicle may include an autonomous, semi-autonomous, and/or manned vehicle that is configured with one or more sensors that capture sensor data associated with the environment. The one or more sensors may include light detection and ranging (lidar) sensors, radio detection and ranging (radar) sensors, sound detection and ranging (sonar) sensors, image capture devices (e.g., RGB cameras, intensity cameras, IR cameras, stereo cameras, depth cameras, etc.), or other sensors. As a non-limiting example, the vehicle may be an autonomous vehicle configured with eight (8) lidar sensors. Each of the lidar sensors may return data corresponding to detected surfaces in an environment. The data may be represented as points (e.g., data points) having coordinates (e.g., Cartesian, polar, etc.) corresponding to at least a part of the detected surface.

In some examples, one or more vehicles may pass a portion of the environment multiple times from a same or similar viewpoint and/or from a different view point and sensor data captured by the one or more vehicles may be received and aggregated into a collection of sensor data. The collection of sensor data received from the one or more vehicles may therefore comprise subsets of sensor data that are associated with a same portion of the environment. For example, the collection of sensor data may include first sensor data that was received from a vehicle in association with a portion of the environment and second sensor data associated with the same portion received from the vehicle at a subsequent time or from another vehicle. The first sensor data and the second sensor data may be associated with a same, similar, or different sensor poses. In other words, at the time the first sensor data was captured, the sensor(s) of the vehicle were located and oriented in a first pose (i.e., a pose may comprise a location and/or orientation) and the second sensor data was captured while the sensor(s) of the vehicle (or another vehicle) may have been located at a same, similar, or different pose In other words, a portion of an environment may be visible from the same and different poses. Therefore, although the second sensor data may be associated with the same portion of the environment as the first sensor data, the second sensor data may comprise at least a portion of sensor data that is associated with alternate or additional parts of that portion. For example, the first sensor data may include data points indicative of a surface of a first side of a building and the second sensor data may include data points indicative of the surfaces of the first side and/or a second side of the same building due to the second sensor data being captured from a different pose than the first sensor data.

Determining a map of the environment using at least some of the collected sensor data may include determining a link between first sensor data and second sensor data of the collected sensor data, where the link may indicate that the first sensor data and the second sensor data are associated with a same portion of the environment and/or the link may indicate that a first pose is associated with a second pose. Determining the link may be based at least in part on determining that a first pose and a second pose satisfy a global parameter such as, for example, a threshold distance between poses, a similarity of sensor data associated with two poses, and/or the like. Such a link may be a proposed link. The first pose may be associated with the first sensor data and the second pose may be associated with the second sensor data so the link may implicitly (or explicitly as stated above) associated the first sensor data and the second sensor data. In some examples, the first pose and/or the second pose may be poses estimated by an autonomous vehicle (e.g., using a Bayesian filter (such as a Kalman filter), bundle adjustment, maximum a posteriori estimation (MAP), and/or any simultaneous localization and mapping (SLAM) algorithm), as discussed in more detail in U.S. patent application Ser. No. 15/674,853, filed Aug. 11, 2017, the entirety of which is incorporated herein.

In some examples, determining the map may additionally or alternatively comprise determining an alignment of the first sensor data to the second sensor data based at least in part on the link. For example, determining the alignment may be based at least in part on the existence of the proposed link between a first pose and a second pose. The link may cause the system discussed herein to attempt to determine transform(s) of the pose(s) to align the sensor data associated therewith and/or associating the transform(s) with the link once the transform(s) have been determined. In some examples, the techniques may comprise displaying proposed links before determining alignment(s) and/or a map. Aligning the first sensor data and the second sensor data may comprise perturbing at least one of the poses associated with the first sensor data and the second sensor data to reduce an error associated with the alignment. In some examples, the error may comprise a total residual between respective data points of the first sensor data and the second sensor data. In other words, the error may be an indication of how far off the first sensor data is from being aligned with the second sensor data.

Perturbing a pose may comprise moving a position and/or orientation of the pose (e.g., laterally and/or longitudinally changing coordinates associated with the pose, changing a yaw, roll, and/or pitch associated with the pose), which may be associated with an orientation of the sensor data associated therewith. In other words, changes to the position and/or orientation of a pose may cause corresponding changes to the sensor data associated therewith. In some examples, a pose may be a pose of a discrete sensor or the pose may be a reference frame for one or more sensors, such as a position and/or orientation of the vehicle with which a sensor is associated. In the latter example, a discrete sensor may be associated with a sensor pose relative to the vehicle pose. Once the error is minimized or is otherwise sufficient (e.g., the error is below an error threshold) by perturbing the poses/aligning the sensor data, the transformation associated with the alignment may be stored in association with the link.

The techniques discussed herein may comprise receiving a modification that comprises an instruction to add a link, deleted a link, or modify a parameter associated with a link. For example, the modification may be received based at least in part on a user's interaction with a user interface and the parameter may comprise a covariance and/or a threshold distance. The techniques may comprise initiating a new sensor data alignment based at least in part on receiving the modification. When a link is added, this new alignment may comprise aligning formerly unaligned sensor data, whereas when a link is deleted the new alignment may comprise segregating formerly aligned sensor data. A modification to the parameter, such as the covariance, may comprise additionally including or excluding poses and/or sensor data in the new alignment.

When a modification is received, any new sensor data alignment that is based on the modification may be limited to re-aligning sensor data associated with a window of sensor data (e.g., as opposed to re-aligning an entire region), although re-aligning an entire region associated with the modification may is contemplated. In some examples, determining the window may be based at least in part on a threshold distance (e.g., sensor data associated with operation ±2 meters from a position associated with a pose), a threshold time (e.g., sensor data associated with operation ±0.5 seconds from a time associated with a pose), vehicle speed, a distance between the linked poses, and/or the like. In at least some examples, such a windowed re-optimization may comprise downweighting contributions from measurements as a function of distance from a proposed region including, but not limited to, a Gaussian distribution, a linear function, polynomial, or otherwise such that measurements further from a selected region are modified less and less.

Determining the map may comprise generating a representation of the environment based at least in part on the sensor data alignments (e.g., using the transformations associated with the links in examples where the links each have a transformation associated therewith that aligns the respective sensor data). In some examples, determining the map for a large area, such as a city, may comprise generating a representation such as a mesh and/or wire frame model of the environment based at least in part on thousands or millions of sensor data alignments. At current cloud computing computational constraints, the process of generating the map from the sensor data alignments may take up to a week. In some examples, the vehicle may generate a lower resolution map using on-vehicle computational resources and/or by distributing the computation across one or more vehicles and/or computational resources.

The techniques discussed herein may determine the sensor data alignments across the environment as part of generating the map (i.e., at map-generation time) since the number of alignments may be computationally and temporally costly. In some examples, when a modification is received, an option to redetermine the alignment of sensor data associated therewith may be made available and/or the redetermination may be automatically triggered so that the effectiveness of the modification may be assessed. Additionally or alternatively, the alignments may be computed before generating the map. In at least one non-limiting example, the techniques may comprise waiting to determine the sensor data alignments until the map generation operation except for those sensor data alignments associated with any modifications or at least modifications for which an alignment is triggered by user selection.

The techniques may additionally or alternatively comprise displaying the collected sensor data, estimated trajectory data associated therewith, and/or proposed links. The estimated trajectory data may comprise a series of historical poses estimated by the vehicle associated with the sensor data captured by the vehicle. In a non-limiting example, the techniques may comprise displaying at least the estimated trajectory data, proposed links, and/or a two-dimensional roadway representation (e.g., a top-down map). In some examples, the two-dimensional roadway representation may be used in conjunction with the trajectory data to determine a likelihood that a link should be added, deleted, and/or a parameter associated therewith modified. For example, the techniques may comprise determining that a total residual associated with a sensor data alignment meets or exceeds a threshold, training a machine-learning model to determine sensor data and/or a region that may be problematic (e.g., may require an added, deleted, or adjusted link), and/or the like. In an additional or alternate example, the indication may be generated based at least in part on determining that an error (e.g., residual) associated with a sensor data alignment cannot be reduced below a threshold error.

The techniques discussed herein may additionally or alternatively comprise adding any modifications received to the links and/or data associated therewith to a training data set for training a machine-learning (ML) model to add and/or delete a link, modify a parameter associated with a link, and/or to indicate a region for which to potentially add, delete, or modify a link. In some examples, the training data may comprise an indication of the type of modification (e.g., link addition, link deletion, link parameter adjustment) and/or data associated therewith (e.g., pose data, sensor data, link data).

The techniques discussed herein may reduce the time to generate a map (e.g., a three-dimensional representation) of an environment, reduce the computational resources and power for generating the map, and improve the accuracy of the map. The techniques may improve the safety of a vehicle that uses the map to conduct sensor calibration and/or localization because of the increased accuracy.

EXAMPLE SCENARIO

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, a localization component 114, and/or system controller(s) 116. Although depicted in FIG. 1 for illustrative purposes, it should be understood that the localization component 114 may reside in/on a separate computing device (or otherwise) than any one or more of the other components. In some examples, the perception component 110 may comprise a primary perception component among other perception components, such as a secondary perception component that may be part of collision avoidance component. In some examples, the perception component 110, planning component 112, and/or localization component 114 may comprise a pipeline of hardware and/or software, which may include one or more GPU(s), ML model(s), Kalman filter(s), and/or the like.

In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization data generated by the localization component 114 (e.g., where the vehicle 102 is in the environment relative to a representation 120 of the environment and/or features detected by the perception component 110), and/or the like. The trajectory 118 may comprise instructions for controller(s) 116 to actuate drive components of the vehicle 102 to effectuate a steering angle and/or steering rate, which may result in a vehicle position, vehicle velocity, and/or vehicle acceleration. For example, the trajectory 118 may comprise a target heading, target steering angle, target steering rate, target position, target velocity, and/or target acceleration for the controller(s) 116 to track. The perception component 110, the planning component 112, and/or the localization component 114 may include one or more machine-learned (ML) models and/or other computer-executable instructions.

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The object classifications determined by the perception component 110 may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 110 may be collectively referred to as perception data. Once the perception component 110 has generated perception data, the perception component 110 may provide the perception data to the planning component 112.

The planning component 112 may use the perception data received from perception component 110 and/or localization data received from the localization component 114 to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

In some examples, localization component 114 may receive sensor data and/or perception data and determine a pose of the vehicle 102 based at least in part on the sensor data, perception data, and/or a map. For example, the map may be stored in a memory of the computing device(s) 106 and may comprise a representation 120 of the environment generated according to any of the techniques discussed herein. In some examples, representation 120 may be a mesh (as depicted in FIG. 1) or any other three-dimensional (or other dimensional) representation of the environment. In some examples, the representation 120 may be encoded and/or compressed, as the representation 120 may include at least a small region such as a block or the immediate surroundings of the vehicle, a city, or more. In some examples, the representation 120 may be available to the vehicle 102 via a network interface. For example, the representation 120 may be streamed or otherwise transmitted to the vehicle 102 based at least in part on the route and/or location of the vehicle 102.

In some examples, the vehicle 102 may determine the map or at least part of the map. The localization component 114 may determine a pose (e.g., position and/or orientation) of the vehicle based at least in part on the map (e.g., relative to the representation 120) by matching sensor data to the map and determining a relative pose of the vehicle. The representation 120 may comprise global and/or local coordinates such that determining a pose of the vehicle relative to the map may be sufficient to determine a global pose (e.g., position and/or orientation relative to a city-wide, nation-wise, or globe-wide map) and/or local pose of the vehicle (e.g., position and/or orientation of the vehicle along a city block). In some examples, the localization component 114 may compare sensor data to the representation 120 and determine a real-time pose of the vehicle based at least in part on the comparison. Additionally or alternatively, the localization component 114 may calibrate the sensor(s) 104 based at least in part on the representation 120, as discussed in more detail in U.S. patent application Ser. No. 15/674,853, filed Aug. 11, 2017, the entirety of which is incorporated herein. In some examples, calibrating one of the sensor(s) 104 may comprise adjusting a pose associated with the sensor relative to a pose of the vehicle 102.

In some examples, the vehicle 102 may be a mapping vehicle and may or may not comprise perception component 110 and/or planning component 112, and localization component 114 may comprise a mapping component. Such a mapping vehicle may comprise a manually operated vehicle with sensors to collect data to create such maps.

In some examples, the localization component 114 may store sensor data, such as sensor data 122, in a log in association with an estimated pose of the vehicle, such as pose 124, that was estimated at the time the sensor data 122 was received. In some examples, estimating a pose 124 of the vehicle may be based at least in part on sensor data such an odometry measurement (e.g., wheel encoder output, IMU output), other sensor information (e.g., GPS location, compass output), perception data, and/or localization data (e.g., an estimated pose based at least in part on SLAM techniques). In some examples, generating the log may comprise a SLAM technique and/or components thereof that may conduct moving object detection, detecting a loop closure, and/or the like. In at least some such examples, such loop closures may be used to propose links, as explained in detail herein. The pose 124 may comprise a position 126 and/or heading 128 (e.g., orientation, which may comprise a yaw, pitch, and/or roll). In some examples, multiple estimated poses may be aggregated into an estimated trajectory 130. Sensor data may be associated with one or more of the poses composing the estimated trajectory 130. In at least one non-limiting example, the estimated trajectory 130 may be determined based at least in part on SLAM techniques that are based at least in part on the map/representation 120. The SLAM techniques may comprise a Bayesian filter (such as a Kalman filter), bundle adjustment, maximum a posteriori estimation (MAP), and/or any simultaneous localization and mapping (SLAM) algorithm.

In some examples, the vehicle 102 may transmit the estimated trajectory 130 and the sensor data associated therewith to a remote computing device, which may comprise a distributed computing service, another vehicle, and/or the like. The remote computing device and/or the vehicle 102 may generate the map, which may comprise representation 120 and/or an update to representation 120. In some examples, determining the map may comprise determining a correction 132 to the estimated trajectory, as illustrated by corrected trajectory 134. Note that estimated trajectory 130 may be associated with a greater error/lesser degree of alignment of the estimated trajectory to a location and direction of the roadway 136 compared to the corrected trajectory 134. In some examples, alterations to sensor data alignments may resulted in changed to the trajectory in instances where the trajectory is estimated based at least in part on the resultant map. In some examples, the corrected trajectory 134 may be transmitted to the vehicle 102.

In some examples, an error and/or degree associated with an alignment may be used herein to identify a region and/or one or more poses of the estimated trajectory 130 as candidates for a link modification (e.g., addition, removal, or adjustment). The degree of alignment and/or the suggested link modification may be an output of an ML model trained based at least in part on supervised techniques (e.g., using GPS data where available, using data labeling, using perception and/or planning data).

In some examples, the controller(s) 116 may comprise software and/or hardware for actuating drive components of the vehicle 102 sufficient to track the trajectory 118. For example, the controller(s) 116 may comprise one or more proportional-integral-derivative (PID) controllers.

EXAMPLE SYSTEM

Figure 2:
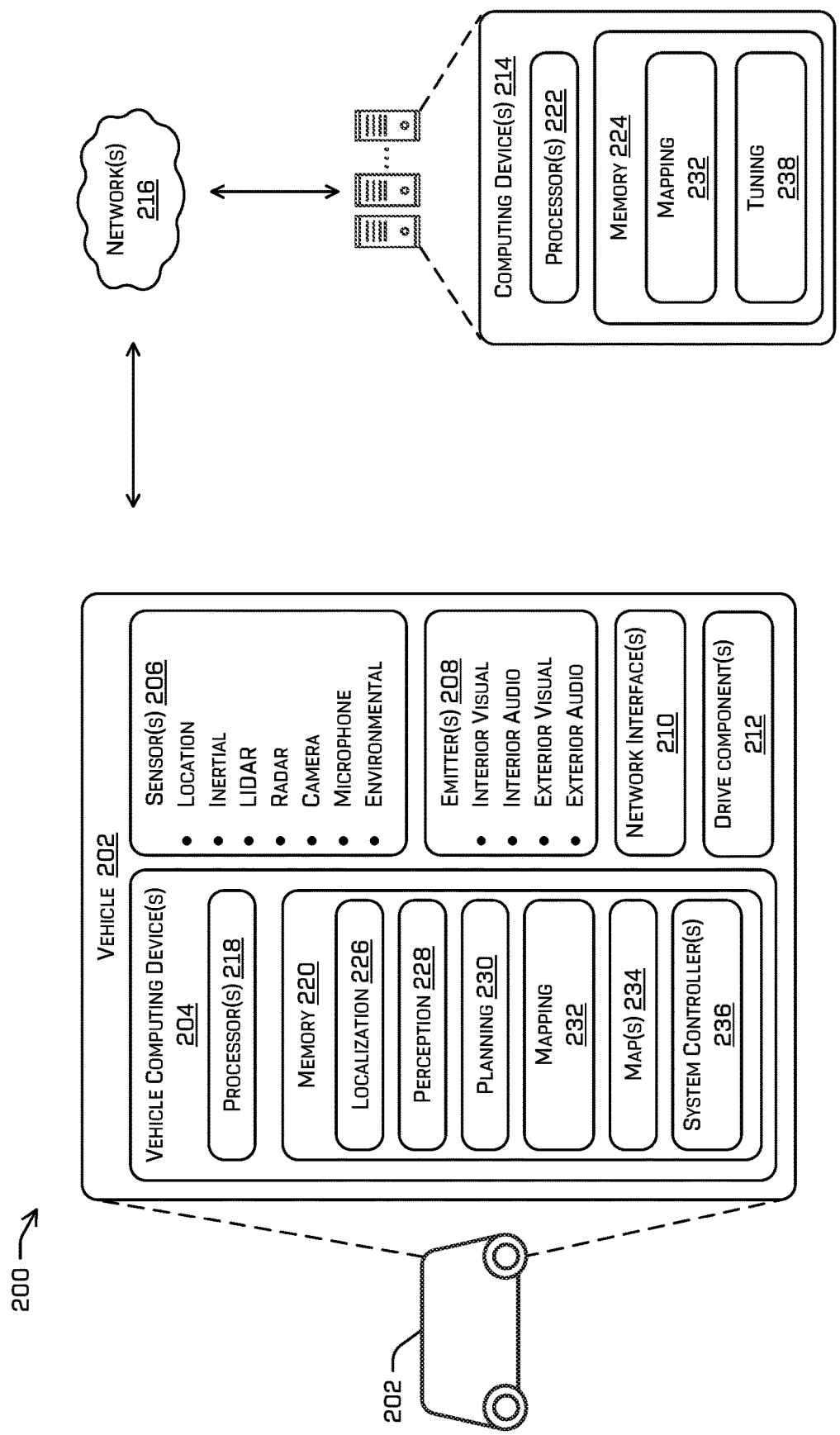
FIG. 2 illustrates a block diagram of an example system comprising a localization component, a mapping component, and a correction component.

FIG. 2 illustrates a block diagram of an example system 200 that implements the techniques discussed herein. In some instances, the example system 200 may include a vehicle 202, which may represent the vehicle 102 in FIG. 1.

In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., IMUs, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a eDC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, mapping component 332, map(s) 234, and/or system controller(s) 236. Localization component 226 may represent localization component 114, perception component 228 may represent perception component 110, and/or planning component 230 may represent planning component 112.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the mapping component 232, a pose (e.g., a location and/or orientation) of the vehicle 202 relative to the environment (e.g., via a position and/or orientation relative to the map(s) 234) and/or sensor data associated therewith.

In some instances, perception component 228 may comprise a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The mapping component 232 may operate on the vehicle 202 and/or on the computing device(s) 214. In some examples, the mapping component 232 may be downstream (receive an output) from sensor(s) 206, the perception component 228 in a pipeline, and/or the planning component 230. The localization component 226 may be configured to pass all, part, or none of the output of the localization component 226 to mapping component 232. In some examples, the mapping component 232 may comprise component(s) for determining collecting sensor data, perception data, and/or pose data from one or more vehicles; determining link(s), determining sensor data alignments, and/or determining a map comprising a representation of an environment based at least in part on the sensor data, link(s), and/or pose data.

The memory 220 and/or 224 may additionally or alternatively store a collision avoidance system, a ride management system, etc. Although localization component 226, perception component 228, planning component 230, mapping component 232, map(s) 234, and/or system controller(s) 236 are illustrated as being stored in memory 220, any of these components may include processor-executable instructions, ML model(s) (e.g., a neural network), and/or hardware and all or part of any of these components may be stored on memory 224 or configured as part of computing device(s) 214. In some examples, a mapping component running on the vehicle 202 may collect and/or encode sensor data (e.g., raw sensor data, sensor data alignment, perception-labeled sensor data), pose data, and/or perception data for transmission to the computing device(s) 214. The mapping component running on the vehicle and/or the computing device(s) 214 may conduct the operations discussed herein to generate a map based at least in part on a link modification.

In some examples, computing device(s) 214 (and/or 204) may comprise a tuning component 238. In some examples, the tuning component may comprise one or more ML models trained on the training data discussed herein. The tuning component may be trained to identify pose(s), sensor data, and/or a region that may be a candidate for a link modification and/or the tuning component may output a link modification. The tuning component may additionally or alternatively determining a degree of alignment of estimated pose data to a roadway. Determining the pose(s) and/or sensor data associated with a candidate modification may be based at least in part on a degree of alignment associated therewith.

As described herein, the localization component 226, the perception component 228, the planning component 230, the tuning component 238, and/or other components of the system 200 may comprise one or more ML models. For example, the localization component 226, the perception component 228, the planning component 230, and/or the tuning component 238 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Sensor Data Alignment, Trajectories, and Links

Figure 3A:
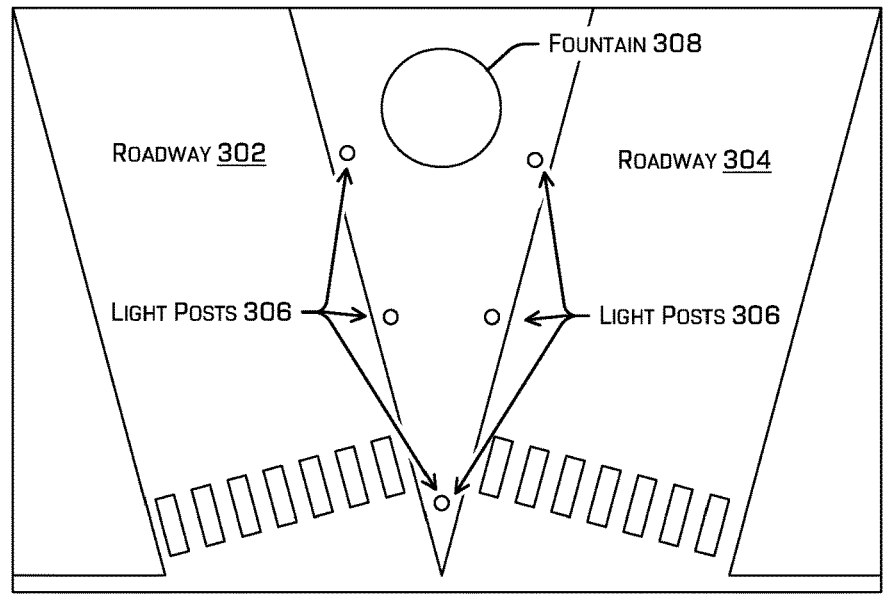
FIG. 3A illustrates an example top-down representation of an environment.

FIG. 3A illustrates an example top-down representation of an environment 300. The example environment 300 includes two roadways (302 and 304, respectively), multiple light posts 306, and the base of a fountain 308.

Figure 3B:
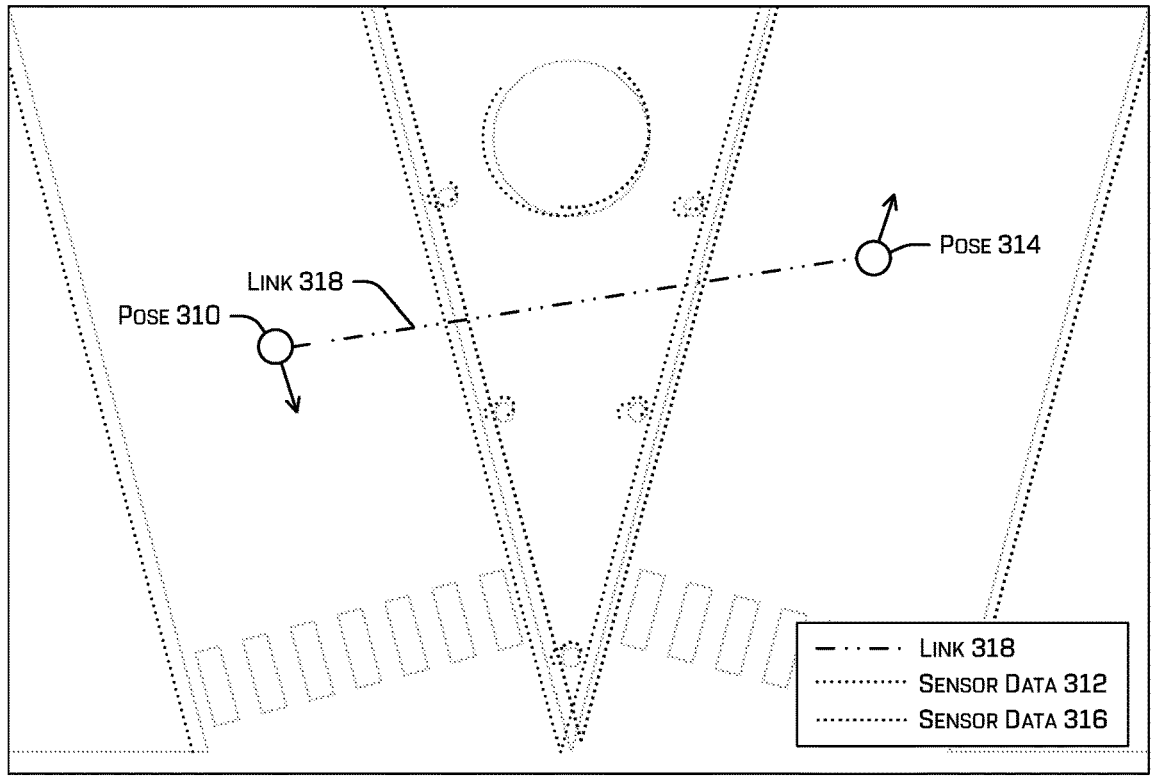
FIG. 3B illustrates two sets of sensor data associated with two different poses, a link between the poses, and an example sensor data alignment.

FIG. 3B illustrates data that may be part of log data generated by an autonomous and/or mapping vehicle. In the illustrated example, the log data is overlaid a representation of the environment 300 for reference and the representation of environment 300 is represented in gray lines. In some examples, the log data may comprise log data received from one or more autonomous and/or mapping vehicles. The log data may include, for example, at least a pose 310 (e.g., an estimated position and/or orientation of the vehicle) associated with sensor data 312, both of which may have been generated by a first vehicle as it traversed environment 300. The log data may additionally or alternatively include pose 314 associated with sensor data 316, both of which may have been generated by a first vehicle or a second vehicle as the first vehicle or second vehicle traversed environment 300. The sensor data 312 and/or sensor data 316 may represent lidar data, depth camera data, and/or the like. In some examples, pose 310 and/or pose 314 may be part of a trajectory generated by a vehicle.

The log data may be transmitted to computing device(s), such as computing device(s) 214, which may determine a link 318 between pose 310 and pose 314 based at least in part on one or more global parameters of a SLAM, loop closures, and/or other mapping algorithm for determining a likelihood that sensor data associated with two different poses likely includes a common view of the environment (e.g., at least a portion of the two sets of sensor data corresponds with a same portion of the environment and/or a different perspective of a same portion of the environment). For example, a global parameter may comprise a threshold distance and/or a threshold similarity (e.g., threshold degree of alignment) and determining the (proposed) link 318 may comprise determining that a distance between pose 310 and pose 314 is less than or equal to the threshold distance and/or a degree of alignment determined between the sensor data 312 and sensor data 316 meets or exceeds a threshold degree of alignment. In some examples, determining the link 318 may comprise determining pose(s) within a threshold parameter of a terminus of the link (e.g., within a covariance, σ, of the terminus of the link or 3 σ of the terminus of the link).

FIG. 3B may depict the sensor data pre-alignment or may depict a sensor data alignment since the sensor data does not overlap and/or is disjoint. Determining the alignment may comprise determining sensor data associated with the pose(s). For example, determining the sensor data may comprise determining sensor data that is within a window of a pose, where the window may be a span of distance or time around the pose (e.g., ±2 meters, ±0.5 s, although other windows are contemplated and need not be even in the positive and negative directions and may be based at least in part on a speed of the vehicle or operating characteristics of a sensor, such as a frame capture rate and/or the like). Such alignment may comprise, for example, Iterative Closest Point (ICP) estimations, or other optimizations, as described herein. In the depicted example, the first sensor data and the second sensor data both comprise multiple lidar data collections, each of which may be associated with a different pose or, in other examples, may be associated with a same pose when poses are determined at a lower frequency than a frequency at which the sensor data is captured. Determining the alignment may comprise perturbing an estimated pose associated with the sensor data to reduce an error of alignment of the first data to the second data. For example, aligning sensor data 312 and sensor data 316 may comprise perturbing pose 310 and/or pose 314 until sensor data 312 and sensor data 316 associated with the light posts 306 and fountain 308 overlaps and/or is continuous.

FIG. 3B also provides an example of a display that may be caused by the techniques discussed herein responsive to receiving an instruction to modify link 318 (e.g., by adding link 318 or modifying a parameter associated with link 318). Based at least in part on receiving the instruction, the alignment for the sensor data associated with the link 318 may be triggered or made available for user initiation so that the alignment resulting from the modification may be evaluated before the map of the environment is generated. A sensor data alignment of sensor data associated with non-modified links may be delayed until the map is generated, although it is understood that such alignments may be determined at any other time (e.g., as part of determining a link, in some instances).

Example Process

Figure 4:
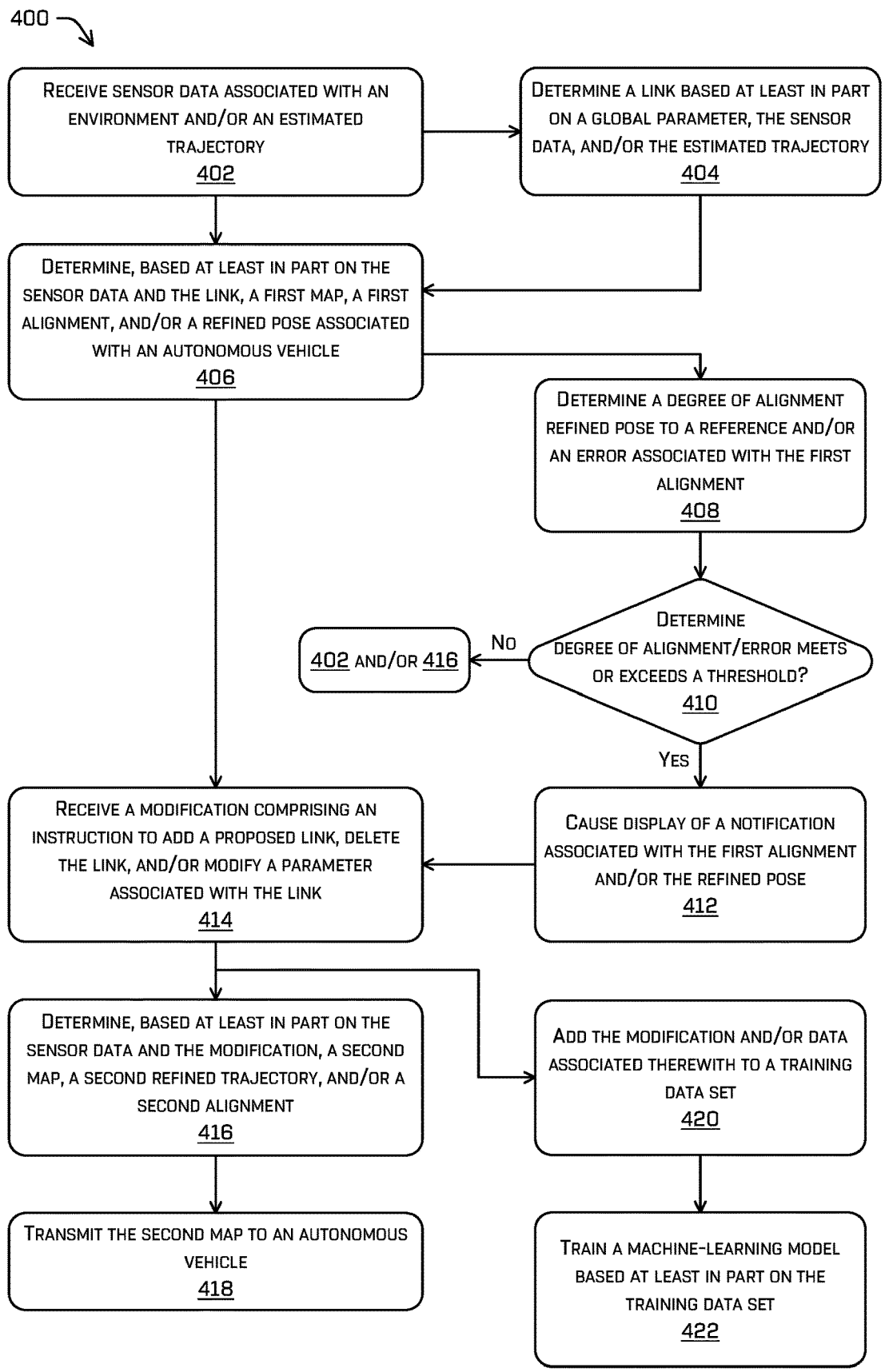
FIG. 4 illustrates a flow diagram of an example process for correcting a sensor localization, sensor data alignment, and/or trajectory, determining a map, and/or generating training data for training a machine-learning model to identify links to remove, add, or adjust.

FIG. 4 illustrates a flow diagram of an example process 400 for generating a map of an environment, identifying and/or correcting portions of the map, and/or training a machine-learning model to modify links during or before generation. In some examples, example process 400 may be executed by at least a mapping component and/or a tuning component.

At operation 402, example process 400 may comprise receiving sensor data associated with an environment and/or receiving an estimated trajectory, according to any of the techniques discussed herein. For example, the sensor data may comprise lidar data, radar data, infrared image data, visual image data, sonar data, and/or the like. In some examples, the estimated trajectory may be associated with the sensor data. The sensor data and or estimated trajectory may be part of a collection of sensor data and/or estimated trajectories received from one or more vehicles. In some examples, an estimated trajectory may comprise one or more poses. A pose may indicate an estimated position and/or heading of the vehicle, as estimated based at least in part on a SLAM algorithm, which may be based at least in part on a simple mapping of the environment conducted by the vehicle. The pose may be associated with one or more frames (e.g., serialized or time-stamped sensor data) of the sensor data. For example, the pose may be associated with frames of sensor data that were captured at or around a time at which the vehicle determined the estimated pose.

At operation 404, example process 400 may comprise determining a link based at least in part on a global parameter, the sensor data, and/or the estimated trajectory, according to any of the techniques discussed herein. For example, determining the link may comprise determining an edge between nodes of a factor graph where the nodes are different poses, attempting to match sensor data associated with two different poses. In at least one non-limiting example, an algorithm may sample a trajectory at frequency (e.g., every 5 meters, may be based at least in part on speed of the vehicle) and determine whether another trajectory satisfies the global parameters relative to the sample. For example, operation 404 may comprise determining a first pose based at least in part on sampling a trajectory and determining that a distance from the first pose to a second pose of a second trajectory is less than a threshold distance.

In some examples, the link may comprise a transformation associated with two or more poses (e.g., determined based at least in part on aligning sensor data associated with the two or more poses) and/or a parameter, such as a covariance and/or threshold distance. The covariance and/or threshold distance may be used as part of determining an alignment in identifying sensor data that may be associated with a same element and/or constraint(s) for perturbing the poses. In some instances, determining the link may be based at least in part on a global parameter such as, for example, a match score threshold, a threshold distance between poses, and/or the like.

At operation 406, example process 400 may comprise determining, based at least in part on the sensor data and a link, a first alignment, according to any of the techniques discussed herein. In some examples, determining the link may be part of determining the alignment. Determining the alignment may comprise perturbing an estimated pose associated with the sensor data to reduce an error of alignment of the first data to the second data, as discussed further in U.S. patent application Ser. No. 15/675,487, filed Aug. 11, 2017, the entirety of which is incorporated herein. In some examples, determining the link and/or the alignment may comprise an anxious search, an iterative closest points (ICP) algorithm, graph-based SLAM, and/or any other SLAM algorithm. In some examples, the final perturbation of the pose(s) to achieve the alignment may be stored as a transformation associated with the link. In some examples, the transformation may be used to correct and/or refine an estimated pose and/or determine a corrected/refined trajectory. Additionally or alternatively operation 406 may comprise determining a map. In an additional or alternate example, operation 406 may comprise determining the refined trajectory before determining the sensor data alignment.

At operation 408, examples process 400 may comprise determining a degree of alignment associated with the first alignment. In some examples, the degree of alignment may comprise a residual calculated as part of the pose perturbation and/or an additional error associated with the alignment. In an additional or alternate example, an ML model or other algorithm may be trained to determine a degree of alignment associated with a section of a trajectory comprising multiple poses.

At operation 410, example process 400 may comprise determining whether the degree of alignment and/or the error meets or exceeds a threshold, according to any of the techniques discussed herein. If the degree of alignment and/or the error meets or exceeds the threshold, operation 410 may transition to operation 412, otherwise example process 400 may transition to 402, 414, or 416.

At operation 412, example process 400 may comprise causing display of a notification associated with the first alignment and/or a refined trajectory, according to any of the techniques discussed herein. For example, the example process 400 may comprise transmitting a warning message with data associated with the first alignment and/or the refined trajectory, causing display of the first alignment and/or the refined trajectory, coding the first alignment and/or the refined trajectory based at least in part on the (e.g., color coding a display of the refined trajectory), and/or the like. In some examples, if the degree of alignment does not meet the threshold and a link exists between a first pose and a second pose, operation 412 may comprise causing display of a suggestion and/or option to remove the link. In an additional or alternate example, if a degree of alignment meets or exceeds the threshold and no link exists, operation 412 may comprise causing display of a suggestion and/or option to add a link to two poses associated with the alignment.

At operation 414, example process 400 may comprise receiving a modification comprising an instruction to add a proposed link, delete the link, and/or modify a parameter associated with the link, according to any of the techniques discussed herein. In some examples, a sensor data alignment may be determined responsive to receiving the instruction and/or an option to run the sensor data alignment may be made available (e.g., via a user interface, over a publish subscribe system to a tuning and/or mapping component).

Figure 5A:
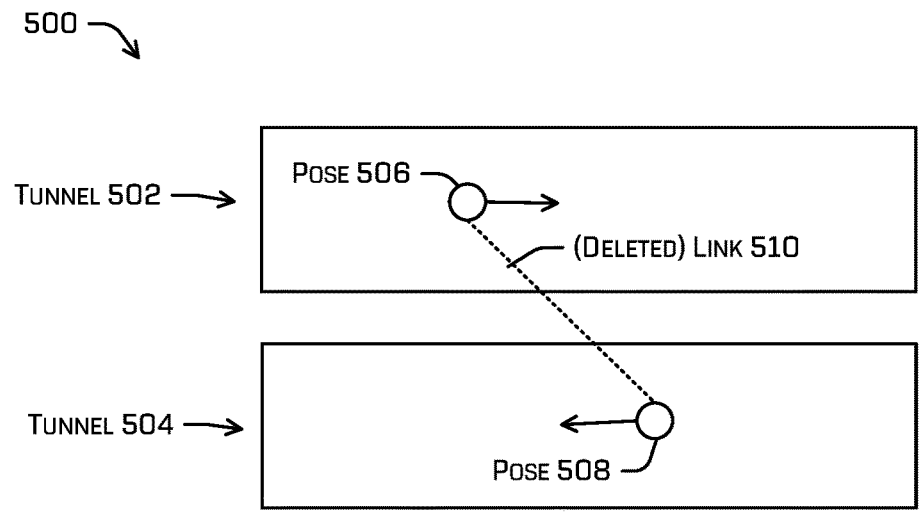
FIGS. 5A and 5B illustrate two types of link modifications.

FIG. 5A depicts an example scenario 500 where deleting a link increases the accuracy of the resultant map. FIG. 5A depicts two tunnels, tunnel 502 and tunnel 504. Since tunnels may appear to be very similar in sensor data, the link determination step may generate a link 510 associating a pose 506 in tunnel 502 with pose 508 in tunnel 504. If a map is generated based at least in part on link 510, the sensor data may align well and the resultant map may merge the two tunnels into a single tunnel. Overpasses and other uniform features may also cause this effect. Deleting the link 510 may cause the mapping component to skip over trying to align sensor data associated with pose 506 with sensor data aligned with pose 508, resulting in two distinct tunnels in a resultant map. In some examples, the generation of the link in this scenario may be permitted by a global parameter associated with link generation and/or sensor data alignment.

Figure 5B:
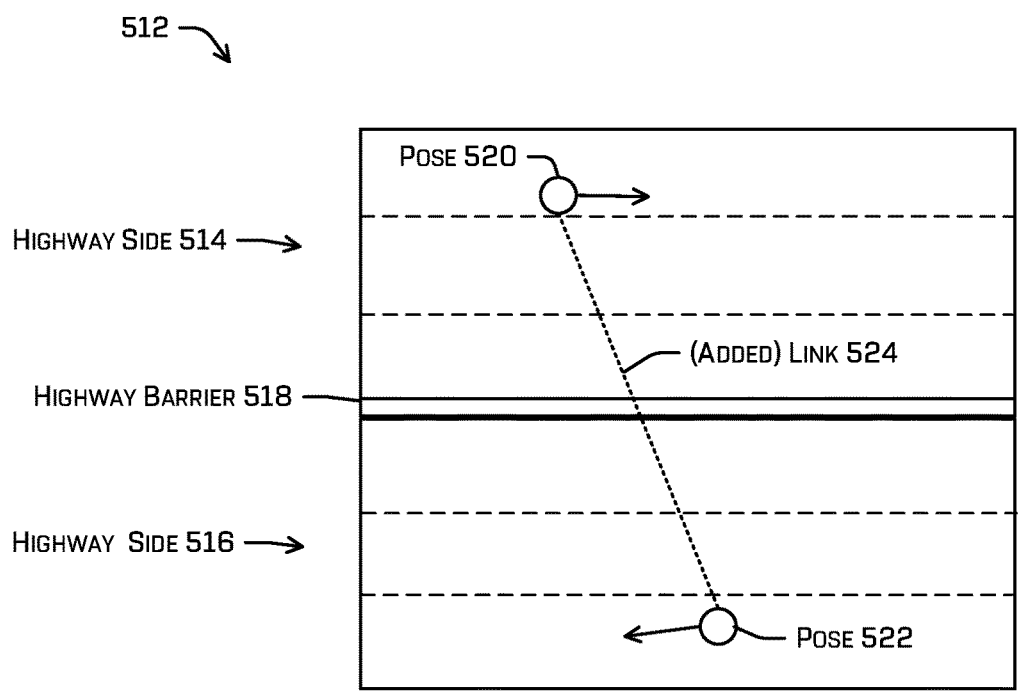

FIG. 5B depicts an example scenario 512 illustrating two sides of a highway (514 and 516, respectively) divided by a highway barrier 518. In the example scenario 512, a pose 520 on highway side 514 was not linked to pose 522 on highway side 516, even though a substantial amount of sensor data associated with the two poses overlaps. Adding link 524 may cause the mapping component to determine a sensor data alignment for the sensor data associated with pose 520 and pose 522 respectively. A map generated from the sensor data alignment may comprise more detail as a result of the addition of link 542. In some examples, the failure to generate a link in this scenario may be based at least in part on a global parameter that constrains the link from being generated.

In some examples, updating (re-aligning) a sensor data alignment based at least in part on a modification to a link (e.g., addition, deletion, alteration) may comprise disassociating sensor data and/or may comprise down-weighting perturbations the further poses are from the link, although in additional or alternate examples, the perturbations may be equally or otherwise weighted. In some such examples, such realignment may comprise a pose-graph relaxation, non-linear least squares optimization, bundle adjustment, or any other filtering/mapping algorithm (e.g., SLAM).

At operation 416, example process 400 may comprise determining, based at least in part on the sensor data and the modification, a second map, a second refined trajectory, and/or a second alignment, according to any of the techniques discussed herein. Determining a second alignment may comprise determining a new alignment or determining a re-alignment. In some examples, determining the second alignment may comprise determining a window of sensor data associated with the modification. For example, this may comprise determining sensor data that is associated with two poses that have been disassociated from each other, two poses that have been newly associated, or a link associated with the two poses that has had a parameter changed. The window may comprise a span of time and/or distance relative to a pose. In some examples, newly/re-aligning sensor data associated with a window of sensor data may comprise weighting the sensor data based at least in part on a proximity of the sensor data to a time and/or position associated with a linked pose. For example, the alignment may down-weight (e.g., apply a lower and lower scalar value to, increase a covariance or other rigidity parameter) an attempt to align sensor data the further the sensor data is from the linked pose in time and/or distance. Such weighting may be a function of such a distance, including, but not limited to, a Gaussian, linear, polynomial, Sigmoid, etc. In some examples, modifying weights associated with the window of the sensor data may comprise modifying a sampling rate associated with the window of sensor data (e.g., decrease the sampling rate further from a time and/or position associated with In some examples, when the modification(s) have been received and any updated alignments have been generated and an instruction to generate the map is received the remaining sensor data alignments may be determined (e.g., in some examples, the sensor data associated with non-modified links and/or modified links that weren't selected to create an updated alignment or weren't set to cause an automatic alignment) based at least in part on the respective links associated therewith. Determining the alignments may comprise a pose graph relaxation, ICP, anxious search, and/or the like.

In some examples, determining the map may comprise determining a representation of the environment based at least in part on the sensor data alignments. For example, determining the map may comprise determining a polyline model by a marching squares algorithm, dual contouring algorithm, and/or the like and/or a mesh model and/or wireframe model based at least in part on a marching cubes algorithm, dual contouring algorithm, ray-tracing, and/or the like.

At operation 418, example process 400 may comprise transmitting the second map to an autonomous vehicle, according to any of the techniques discussed herein. In some examples, the autonomous vehicle may use the map to conduct sensor calibration and to localize the autonomous vehicle and/or sensors of the autonomous vehicle.

At operation 420, example process 400 may comprise adding the modification and/or data associated therewith to a training data set, according to any of the techniques discussed herein. For example, upon acceptance of a modification (e.g., when an instruction to generate the map is received, which provides implicit acceptance, or an explicit acceptance is received from a user), the modification and/or related data may be added to the training data set. In some examples, the training data may comprise an indication of what type of modification was made, parameters associated with the link (e.g., location of the termini, a covariance associated therewith), perception data related to the link (e.g., a bridge, overpass, or other problematic structure was detected), at least a portion of the sensor data, and/or two or more poses, and/or characteristics of the environment (e.g., dimensions, location, and/or number of objects in the environment, a number of lanes of the roadway, a curvature associated with the roadway, a proximity of a portion of the roadway to an intersection, a number of roadways intersecting at the roadway).

At operation 422, example process 400 may comprise training an ML model based at least in part on the training data set, according to any of the techniques discussed herein. The ML model may be trained to output a modified set of global parameters, a region of an environment and/or a pose that may require modification, an instruction to modify a link, a likelihood that a link should be created and/or deleted, determine a likelihood that sensor data is likely to be associated with a degree of alignment that does not meet a threshold, and/or the like. In some examples, at run-time the ML model may receive proposed alignment data associated with a region as input and may output a null output or a modification to the link(s) associated with the region. The proposed alignment data may comprise the sensor data, pose/trajectory data, and/or any links generated therefor associated with the region. The ML model may iteratively receive input, region-by-region, and output any modifications to each region until the proposed alignment data associated with the surveyed environment has been provided as input to the ML model.

Example process 400 may comprise more or less operations and the operations depicted and discussed herein may be order in any other order. The operations discussed herein may be accomplished as different processes and/or may be processed in parallel. In some examples, operations depicted as being distinct may be merged into a single operation and vice versa.

EXAMPLE CLAUSES

A. A method comprising: receiving sensor data associated with an environment; determining, based at least in part on the sensor data and a link, a first map and a first trajectory associated with a vehicle, the first trajectory comprising a plurality of poses and the link comprising an indication that a first portion of the sensor data associated with a first pose of the first trajectory corresponds to a second portion of the sensor data associated with a second pose; receiving a modification comprising at least one of an instruction to add a proposed link or an instruction to delete the link; determining, based at least in part on the sensor data and the modification, a second map and a second trajectory; and transmitting the second map to an additional vehicle.

B. The method of paragraph A, wherein: the sensor data comprises first sensor data and second sensor data, wherein the first sensor data is associated with a first sensor of a first system and the second sensor data is associated with second sensor data of a second system.

C. The method of either paragraph A or B, wherein determining at least one of the second map or the second trajectory comprises determining a window of sensor data associated with the modification, wherein determining the second map comprises re-determining part of the first map associated with a portion of the environment corresponding to the window of sensor data.

D. The method of any one of paragraphs A-C, wherein determining the window of sensor data comprises determining a subset of the sensor data that is within a threshold distance or a threshold time of a position or time associated with the modification.

E. The method of any one of paragraphs A-D, wherein: determining the first portion and the second portion is based at least in part on at least one of a covariance, sampling rate, or scalar associated with the link; and the modification further comprises an alteration of at least one of the covariance, sampling rate, or scalar.

F. The method of any one of paragraphs A-E, wherein: based at least in part on receiving the modification, the modification, the first portion, and the second portion are added to a training data set; and the method further comprises training a machine-learning model based at least in part on the training data set, the machine-learning model trained to identify one or more modifications to add a link or remove a link.

G. A system comprising: one or more processors; and a memory storing processor-executable instructions that, when executed by the one or more processors, cause the system to perform operations comprising: receiving sensor data associated with an environment; determining, based at least in part on the sensor data and a link, a first alignment, wherein: the link comprises an indication that a first portion of the sensor data associated with a first pose of a vehicle corresponds to a second portion of the sensor data associated with a second pose, and the first alignment comprises an alignment of the first portion of the sensor data to the second portion of the sensor data; receiving a modification comprising at least one of an instruction to add a proposed link, an instruction to delete the link, or a modification of an uncertainty associated with the link; and determining, based at least in part on the sensor data and the modification, a second alignment.

H. The system of paragraph G, wherein the operations further comprise: determining a map based at least in part on the second alignment; and at least one of transmitting the map to an autonomous vehicle or causing the second alignment to be displayed.

I. The system of either paragraph G or H, wherein the operations further comprise: determining a degree of alignment associated with the first alignment or unaligned sensor data; and generating a notification indicating a region associated with the degree of alignment, the notification indicating a candidate modification; wherein the modification is received based at least in part on the notification.

J. The system of any one of paragraphs G-I, wherein: the sensor data comprises first sensor data and second sensor data, and the first sensor data is associated with a first sensor of a first system and the second sensor data is associated with second sensor data of a second system.

K. The system of any one of paragraphs G-J, wherein determining the second alignment comprises determining a window of sensor data associated with the modification, wherein determining the second alignment comprises re-determining part of the first alignment associated with a portion of the environment corresponding to the window of sensor data.

L. The system of any one of paragraphs G-K, wherein determining the window of sensor data comprises determining a subset of the sensor data that is within a threshold distance or a threshold time of a position or time associated with the modification.

M. The system of any one of paragraphs G-L, wherein: based at least in part on receiving the modification, the modification, the first portion, and the second portion are added to a training data set; and the operations further comprise training a machine-learning model based at least in part on the training data set, the machine-learning model trained to identify one or more modifications to add another link, remove the link, or alter a parameter associated with the link.

N. One or more non-transitory computer-readable media storing processor-executable instructions that, when executed by one or more processors, cause the one or more processors to perform operations comprising: receiving sensor data associated with an environment; determining, based at least in part on the sensor data and a link, a first alignment, wherein: the link comprises an indication that a first portion of the sensor data associated with a first pose of a vehicle corresponds to a second portion of the sensor data associated with a second pose, and the first alignment comprises an alignment of the first portion of the sensor data to the second portion of the sensor data; receiving a modification comprising at least one of an instruction to add a proposed link, an instruction to delete the link, or a modification of a parameter associated with the link; and determining, based at least in part on the sensor data and the modification, a second alignment.

O. The one or more non-transitory computer-readable media of paragraph N, wherein the operations further comprise: determining a map based at least in part on the second alignment; and at least one of transmitting the map to an autonomous vehicle or causing the second alignment to be displayed.

P. The one or more non-transitory computer-readable media of either of paragraph N or O, wherein the operations further comprise: determining a degree of alignment associated with the first alignment or unaligned sensor data; and generating a notification indicating a region associated with the degree of alignment, the notification indicating a candidate modification; wherein the modification is received based at least in part on the notification.

Q. The one or more non-transitory computer-readable media of any one of paragraphs N-P, wherein: the sensor data comprises first sensor data and second sensor data, and the first sensor data is associated with a first sensor of a first system and the second sensor data is associated with second sensor data of a second system.

R. The one or more non-transitory computer-readable media of any one of paragraphs N-Q, wherein determining the second alignment comprises determining a window of sensor data associated with the modification, wherein determining the second alignment comprises re-determining part of the first alignment associated with a portion of the environment corresponding to the window of sensor data.

S. The one or more non-transitory computer-readable media of any one of paragraphs N-R, wherein determining the window of sensor data comprises determining a subset of the sensor data that is within a threshold distance or a threshold time of a position or time associated with the modification.

T. The one or more non-transitory computer-readable media of any one of paragraphs N-S, wherein: based at least in part on receiving the modification, the modification, the first portion, and the second portion are added to a training data set; and the operations further comprise training a machine-learning model based at least in part on the training data set, the machine-learning model trained to identify one or more modifications to add a link or remove a link.

U. The method of any one of paragraphs A-F, wherein the perturbing comprising at least one of a longitudinal, lateral, vertical, yaw, roll, or pitch movement of an estimated location and heading associated with a first sensor relative to a second sensor.

V. The method of any one of paragraphs A-F or U, further comprising: receiving additional sensor data from an autonomous vehicle; determining at least one of a location or a heading of the additional autonomous vehicle based at least in part on comparing the additional sensor data to the second map.

W. The method of any one of paragraphs A-F, U, or V, further comprising controlling the autonomous vehicle based at least in part on the at least one of the location or the heading.

X. The method of any one of paragraphs A-F or U-W, wherein determining the map comprises: projecting the first sensor data and the second sensor data into a voxel space based at least in part on the set of links, the first pose data, and the second pose data; and determining a mesh representation of the voxel space.

While the example clauses described above are described with respect to one particular implementation, it should be understood that, in the context of this document, the content of the example clauses can also be implemented via a method, device, system, computer-readable medium, and/or another implementation. Additionally, any of examples A-X may be implemented alone or in combination with any other one or more of the examples A-X.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving sensor data associated with an environment;
   determining, based at least in part on the sensor data and a first link, a first map and a first trajectory associated with a vehicle, the first trajectory comprising a plurality of poses and the first link comprising a first indication that a first portion of the sensor data associated with a first pose of the first trajectory corresponds to a second portion of the sensor data associated with a second pose, wherein determining the first link comprises:
   determining, based on the first portion, the first pose,
   determining, based on the second portion, the second pose,
   determining a distance based on the first pose and the second pose,
   determining that the distance falls below a threshold, and
   based at least in part on determining that the distance falls below the threshold, generating the first link in association with the first portion and the second portion;
   receiving, from a user, an instruction for a modification comprising at least one of adding a second link or deleting the first link, the second link comprising a second indication that a third portion of sensor data associated with a third pose of the plurality of poses corresponds to a fourth portion of sensor data associated with a fourth pose of the plurality of poses;
   determining, based at least in part on the sensor data and the modification, a second map and a second trajectory; and
   transmitting the second map to an additional vehicle, wherein the additional vehicle is configured to be controlled based at least in part on the second map.

2. The method of claim 1, wherein:
   the sensor data comprises first sensor data and second sensor data,
   wherein the first sensor data is associated with a first sensor of a first system and the second sensor data is associated with a second sensor of a second system.

3. The method of claim 1, wherein:
   the modification comprises adding the second link,
   determining at least one of the second map or the second trajectory comprises, based on determining that the modification comprises adding the second link, determining a window of sensor data associated with the modification,
   determining the window of sensor data is based on a threshold distance associated with at least one of the third portion or the fourth portion, and
   determining the second map comprises re-determining part of the first map associated with a portion of the environment corresponding to the window of sensor data.

4. The method of claim 3, wherein determining the window of sensor data comprises determining a subset of the sensor data that is within:
   a threshold distance of a position associated with at least one of the first link or the second link, or
   a threshold time of a time associated with at least one of the first link or the second link.

5. The method of claim 3, wherein:
   determining to associate the first portion and the second portion by the first link is based at least in part on at least one of a covariance, sampling rate, or scalar associated with the first link; and
   the modification comprises at least one of adding the second link, deleting the first link, or modifying the first link by altering at least one of the covariance, the sampling rate, or the scalar.

6. The method of claim 1, wherein:
   based at least in part on receiving the modification, the modification, the first portion, and the second portion are added to a training data set; and
   the method further comprises training a machine-learning model based at least in part on the training data set, the machine-learning model trained to identify one or more second modifications to add a third link or remove the third link.

7. A system comprising:
   one or more processors; and
   a memory storing processor-executable instructions that, when executed by the one or more processors, cause the system to perform operations comprising:
   receiving sensor data associated with an environment;
   determining, based at least in part on the sensor data and a first link, a first map and a first trajectory associated with a vehicle, the first trajectory comprising a plurality of poses and the first link comprising a first indication that a first portion of the sensor data associated with a first pose of the first trajectory corresponds to a second portion of the sensor data associated with a second pose, wherein determining the first link comprises:
   determining, based on the first portion, the first pose,
   determining, based on the second portion, the second pose,
   determining a distance based on the first pose and the second pose,
   determining that the distance falls below a threshold, and
   based at least in part on determining that the distance falls below the threshold, generating the first link in association with the first portion and the second portion;

receiving, from a user, an instruction for a modification comprising at least one of adding a second link or deleting the first link, the second link comprising a second indication that a third portion of sensor data associated with a third pose of the plurality of poses corresponds to a fourth portion of sensor data associated with a fourth pose of the plurality of poses;

determining, based at least in part on the sensor data and the modification, a second map and a second trajectory; and transmitting the second map to an additional vehicle, wherein the additional vehicle is configured to be controlled based at least in part on the second map.

8. The system of claim 7, wherein:
the sensor data comprises first sensor data and second sensor data,
wherein the first sensor data is associated with a first sensor of a first system and the second sensor data is associated with second sensor a second system.

9. The system of claim 7, wherein:
the modification comprises adding the second link,
determining at least one of the second map or the second trajectory comprises, based on determining that the modification comprises adding the second link, determining a window of sensor data associated with the modification,
determining the window of sensor data is based on a threshold distance associated with at least one of the third portion or the fourth portion, and
determining the second map comprises re-determining part of the first map associated with a portion of the environment corresponding to the window of sensor data.

10. The system of claim 9, wherein determining the window of sensor data comprises determining a subset of the sensor data that is within:
a threshold distance of a position associated with at least one of the first link or the second link, or
a threshold time of the position or time associated with the at least one of the first link or the second link.

11. The system of claim 9, wherein:
determining to associate the first portion and the second portion by the first link is based at least in part on at least one of a covariance, sampling rate, or scalar associated with the first link; and
the modification comprises at least one of adding the second link, deleting the first link, or modifying the first link by altering at least one of the covariance, the sampling rate, or the scalar.

12. The system of claim 7, wherein:
based at least in part on receiving the modification, the modification, the first portion, and the second portion are added to a training data set; and
the operations further comprise training a machine-learning model based at least in part on the training data set, the machine-learning model trained to identify one or more second modifications to add third link or remove the third link.

13. The system of claim 7, wherein the operations further comprise:
determining, based at least in part on the sensor data and the first link, a first alignment, wherein the first alignment comprises an alignment of the first portion of the sensor data to the second portion of the sensor data and wherein determining the first map is based at least in part on the first alignment; and determining, based at least in part on the sensor data and the modification, a second alignment of the first portion of the sensor data to the second portion of the sensor data, wherein determining the second map is based at least in part on the second alignment.

14. One or more non-transitory computer-readable media storing processor-executable instructions that, when executed by one or more processors, cause the one or more processors to perform operations comprising:
receiving sensor data associated with an environment;
determining, based at least in part on the sensor data and a first link, a first map and a first trajectory associated with a vehicle, the first trajectory comprising a plurality of poses and the first link comprising a first indication that a first portion of the sensor data associated with a first pose of the first trajectory corresponds to a second portion of the sensor data associated with a second pose, wherein determining the first link comprises:
determining, based on the first portion, the first pose,
determining, based on the second portion, the second pose,
determining a distance based on the first pose and the second pose,
determining that the distance falls below a threshold, and
based at least in part on determining that the distance falls below the threshold, generating the first link in association with the first portion and the second portion;
receiving, from a user, an instruction for a modification comprising at least one of adding a second link or deleting the first link, the second link comprising a second indication that a third portion of sensor data associated with a third pose of the plurality of poses corresponds to a fourth portion of sensor data associated with a fourth pose of the plurality of poses;
determining, based at least in part on the sensor data and the modification, a second map and a second trajectory; and
transmitting the second map to an additional vehicle, wherein the additional vehicle is configured to be controlled based at least in part on the second map.

15. The one or more non-transitory computer-readable media of claim 14, wherein:
the sensor data comprises first sensor data and second sensor data,
wherein the first sensor data is associated with a first sensor of a first system and the second sensor data is associated with data second sensor of a second system.

16. The one or more non-transitory computer-readable media of claim 14, wherein:
the modification comprises adding the second link,
determining at least one of the second map or the second trajectory comprises, based on determining that the modification comprises adding the second link, determining a window of sensor data associated with the modification,
determining the window of sensor data is based on a threshold distance associated with at least one of the third portion or the fourth portion, and
determining the second map comprises re-determining part of the first map associated with a portion of the environment corresponding to the window of sensor data.

17. The one or more non-transitory computer-readable media of claim 16, wherein determining the window of sensor data comprises determining a subset of the sensor data that is within:
- a threshold distance of a position associated with at least one of the first link or the second link, or
- a threshold time of a position or time associated with at least one of the first link or the second link.

18. The one or more non-transitory computer-readable media of claim 16, wherein:
- determining to associate the first portion and the second portion by the first link is based at least in part on at least one of a covariance, sampling rate, or scalar associated with the first link; and
- the modification comprises at least one of adding the second link, deleting the first link, or modifying the first link by altering at least one of the covariance, the sampling rate, or the scalar.

19. The one or more non-transitory computer-readable media of claim 14, wherein:
based at least in part on receiving the modification, the modification, the first portion, and the second portion are added to a training data set; and
the operations further comprise training a machine-learning model based at least in part on the training data set, the machine-learning model trained to identify one or more second modifications to add a third link or remove the third link.

20. The one or more non-transitory computer-readable media of claim 14, wherein the operations further comprise:
- determining, based at least in part on the sensor data and the first link, a first alignment, wherein the first alignment comprises an alignment of the first portion of the sensor data to the second portion of the sensor data and wherein determining the first map is based at least in part on the first alignment; and
- determining, based at least in part on the sensor data and the modification, a second alignment of the first portion of the sensor data to the second portion of the sensor data, wherein determining the second map is based at least in part on the second alignment.

* * * * *